(12) United States Patent
Angot et al.

(10) Patent No.: US 9,757,890 B2
(45) Date of Patent: Sep. 12, 2017

(54) METHOD FOR PRODUCING AT LEAST ONE FLEXIBLE PLASTIC CONTAINER

(71) Applicant: TECHNOFLEX, Bidart (FR)

(72) Inventors: Maxime M. Angot, Ahetze (FR); Jérôme M. Demonpezat, Bayonne (FR); François M. Capitaine, Anglet (FR)

(73) Assignee: TECHNOFLEX (FR)

( * ) Notice: Subject to any disclaimer, the term of this patent is extended or adjusted under 35 U.S.C. 154(b) by 0 days.

(21) Appl. No.: 14/683,225

(22) Filed: Apr. 10, 2015

(65) Prior Publication Data
US 2016/0236394 A1    Aug. 18, 2016
US 2016/0375623 A9    Dec. 29, 2016

(30) Foreign Application Priority Data

Feb. 16, 2015 (EP) ..................... 15155232

(51) Int. Cl.
*B29C 49/00*    (2006.01)
*B29C 49/42*    (2006.01)
(Continued)

(52) U.S. Cl.
CPC ............. *B29C 49/0047* (2013.01); *A61J 1/06* (2013.01); *A61J 1/067* (2013.01);
(Continued)

(58) Field of Classification Search
None
See application file for complete search history.

(56) References Cited

U.S. PATENT DOCUMENTS 5,824,392 A * 10/1998 Gotoh ................ B29C 49/0047
156/292

FOREIGN PATENT DOCUMENTS

DE    102011004173    8/2012
GB    1567337    5/1980
WO    2012110525    8/2012

OTHER PUBLICATIONS

French Preliminary Search Report, French Application No. 1451268, dated Nov. 18, 2014.

* cited by examiner

*Primary Examiner* — Monica Huson
(74) *Attorney, Agent, or Firm* — Perman & Green LLP

(57) ABSTRACT

The invention relates to a method for the manufacture of at least one flexible plastic container, according to which method each container (10) comprises two separate walls (12, 13) facing one another joined at their circumference by a sealed peripheral edge (14), said separate walls defining a storage space of the container (10). According to the invention, at least the following stages are realized:

a) Forming a pile of two sheets (26, 27) of plastic material, said sheets (26, 27) being laid one against the other, the surfaces which face one another of these sheets (26, 27) being placed directly in contact with one another without any element acting as an interface, b) Simultaneously shaping said sheets (26, 27) thus laid one against the other in order to define said at least one container (10) without having previously separated these sheets, at least each container (10) being partially formed, said sheets (26, 27) being maintained lying one against the other in at least one section of the areas of said sheets (26, 27) intended to constitute said peripheral edge (14) of each container (10) during this shaping and c) Sealing at least partially the areas of said sheets (26, 27) intended to constitute said peripheral edge (14) of at least each container (10).

16 Claims, 3 Drawing Sheets

(51) Int. Cl.
*A61J 1/06* (2006.01)
*B65D 1/09* (2006.01)
*B29L 31/00* (2006.01)
*B29C 49/04* (2006.01)
*B29C 49/48* (2006.01)

(52) U.S. Cl.
CPC .......... *B29C 49/4268* (2013.01); *B65D 1/095* (2013.01); *B29C 49/04* (2013.01); *B29C 49/482* (2013.01); *B29C 2049/0057* (2013.01); *B29C 2791/006* (2013.01); *B29L 2031/712* (2013.01); *B29L 2031/7148* (2013.01)

METHOD FOR PRODUCING AT LEAST ONE FLEXIBLE PLASTIC CONTAINER

BACKGROUND OF THE INVENTION

Field of the Invention

The present invention relates to a method for the manufacture of at least one three-dimensional flexible container, in particular for the cryogenic storage of biological substances.

Technological Background

Flexible pockets for the cryogenic storage of fragile biological substances such as blood are already known of from the prior art.

Some flexible plastic pockets have a particular three-dimensional geometry designed to limit the stress which can be applied at very low temperatures to the biological substances these pockets contain so as to minimize the loss of biological substances.

Thus already known from the prior art are flexible pockets designed for the cryopreservation of liquid biological samples, which pockets comprise two sheets of plastic material each having a three-dimensional geometry sealed on their periphery to define a storage space. These flexible pockets also comprise at least one port for accessing their storage space for the purpose of filling it with and/or emptying it of a liquid biological substance.

To manufacture these flexible pockets multiple different stages must be realized, including in particular the production of the sheets, the forming of each of these sheets independently one of the other so that they each have a particular geometry, the superimposing of the sheets thus formed and the joining by sealing of these with at least one connection element on their periphery.

However, it is noted that the manufacture of such a flexible pocket for cryogenic storage is not only time-consuming and expensive, it additionally exposes this pocket to a real risk of contamination of its internal surfaces delimiting the storage space.

By way of example, such contamination can occur during handling of the thus-formed sheets during the superimposition stage.

Obviously, if contamination of the internal space of the flexible pocket were to occur it could result in a contamination of the biological substance intended to be contained in the storage space of this pocket with germs which could be deadly for a patient undergoing treatment.

Such risk of contamination is also encountered in another method for the manufacture of a three-dimensional flexible pocket by means of thermoforming, in which an insert having a shape, a width and a thickness corresponding to the internal shape, width and thickness of the flexible pocket to be manufactured is placed between the two superimposed sheets.

No matter how much care is subsequently taken to sterilize thus-manufactured flexible pockets, naturally it cannot be fully guaranteed that all of the germs and/or particles have been eliminated.

The risk to the health of patients associated with the use of biological substances contaminated by infected pockets therefore renders these methods of manufacture unsuitable for medical applications.

Furthermore, these methods of flexible pocket manufacture by thermoforming do not permit easy and reliable production of complex storage structures comprising, for example, several storage chambers linked to one another by elements for fluid communication.

The reduced dimensions of each of these storage chambers compared with the dimensions of the mold presents significant problems when it comes to their individual forming and/or when it comes to reproducibility.

There is therefore an urgent need for a method for the manufacture of containers for medical applications permitting production of complex structures which have multiple storage chambers and/or elements for fluid communication, the shape of each individual element of these structures conforming to a predetermined and reproducible geometry.

SUBJECT OF THE INVENTION

Consequently, the present invention seeks to address these various shortcomings by proposing a method for the manufacture of a three-dimensional flexible container which is particularly simple in terms of its design and operation, which is economical and which makes it possible to limit as much as possible the risk of contamination of the storage space throughout the process of manufacturing the container.

Another objective of the present invention is to propose such a method for the manufacture of a three-dimensional flexible container which involves fewer stages, and which is therefore quicker and more economical.

Another subject of the present invention is such a manufacturing method permitting the simultaneous production of several containers as well as a circuit for feeding these containers to facilitate the filling of these containers with a biological substance, while ensuring the conformity of each container or feeding circuit with predetermined shapes.

BRIEF DESCRIPTION OF THE INVENTION

Accordingly the invention relates to a method for the manufacture of at least one flexible plastic container, each container comprising two separate walls facing one another joined on at least a section of their circumference by a sealed peripheral edge, said separate walls defining a storage space.

According to the invention, at least the following stages are realized:

a) Forming a pile of two sheets of plastic material, said sheets being laid one against the other, the surfaces which face one another of these sheets being placed directly in contact with one another without any element acting as an interface, b) Simultaneously shaping said sheets thus laid one against the other in order to define said at least one container without having previously separated these sheets, at least each container being partially formed, said sheets being maintained lying one against the other in at least one section of the areas of said sheets intended to constitute said peripheral edge of each container during this shaping and c) Sealing at least partially the areas of said sheets intended to constitute said peripheral edge of at least each container.

The method of the present invention thus permits the manufacture of at least one flexible vessel designed for the storage of liquid substances and/or of powders and in particular the cryogenic storage of biological substances, in a simple, quick and economical manner, this container having a three-dimensional shape providing optimal capacity and greater resistance to the stresses associated with cryopreservation.

Furthermore, the sheets being laid one against the other limits any introduction of contaminants between these sheets, which contaminants could ultimately end up in the storage space.

In stage b), said sheets thus laid are therefore simultaneously shaped without having previously placed between these sheets an insert such as an added molding element.

Advantageously, in stage b), each container thus shaped has a shape, a width and a spacing between the free walls corresponding to those of the corresponding container to be formed.

When several containers are formed simultaneously, these containers can be identical or at least some of them can be identical. Alternatively, each container formed can also have a distinct three-dimensional shape.

Preferably, with several containers being formed simultaneously, conduits or else bridging links with a tubular shape are also jointly produced to permit fluid communication between these containers. It is thus possible to create a feeding circuit for these containers which not only limits the exposure of each container to any contamination but also permits the filling of all of these containers with a biological material in a single procedure.

In stage b), said sheets can be maintained lying one against the other by prior sealing of the sheets in at least one section of the areas of said sheets intended to constitute said peripheral edge of each container or by means of the surfaces of the mold sections brought to bear one against the other or else by means of a joint delimiting at least a section of the areas of said sheets intended to constitute said peripheral edge of each container.

These sheets can be maintained lying one against the other on all of the areas of said sheets intended to constitute said peripheral edge of each container, or alternatively only in a section of these areas, for example, in order to allow:
  the insertion of one or more access elements or
  the creation of one or more slots each designed to receive an element for accessing the internal storage space, the creation of these slots making it possible to avoid any intake of particles and/or of germs during the insertion of each access element between the sheets of the pile, or alternatively
  the creation of one or more extensions of the walls of the pocket in the form of closed tubes, each of which defines a space having fluid communication with the internal storage space of the pocket.

Obviously, in the two latter cases, the cavities of the mold serving to shape each container have the shapes and dimensions required.

This access element can be a port, a connection element or a tube.

In different particular embodiments of this method, each offering its own advantages and with numerous technical combinations being possible:
  for each container an additional stage is realized consisting of inserting between said sheets at least one element for accessing its storage space, this access element permitting fluid communication between this storage space and the exterior,
  said areas of said sheets intended to constitute said peripheral edge of each container are at least partially sealed before realizing stage b).

This stage is advantageously realized by sealing the sheets on their periphery. Purely for illustrative purposes, this sealing could be a high-frequency sealing.

In stage b), also by shaping of said sheets there is definition of a slot for each element for accessing the storage space of the container or containers, each slot being configured to receive the corresponding access element.

Then all that remains to be done is the permanent attachment of the access element, which can be a connection element or a tube, to said slot formed in the peripheral edge of the container.

This attachment being able to be realized by sealing, it is noted that the creation of this slot into which the access element is inserted advantageously facilitates the sealing thereof.

In stage b), also by shaping of said sheets there is definition of at least one conduit or bridging link, connected to a peripheral edge of at least one container to permit its filling, said conduit defining an internal channel having fluid communication with the storage space of said at least one container.

Having filled said container or containers, there is sealing of the remainder of the sheets separated at said peripheral edge of each container so as to close each container.

Said sheets are also maintained lying one against the other in at least one distinct area of said peripheral edge of one or more containers to divide the internal space of the corresponding container or containers,
  in stage b), there is simultaneous shaping of said two sheets to make at least one flexible container without separating said sheets during this shaping.

This thus advantageously prevents any contamination of the space separating said sheets, or interface, during the shaping stage.

After having at least partially closed each container, said sheets are separated at each container by means of the introduction of the sole biological material intended to be contained in this container or by circulation of a controlled gaseous fluid so as to limit the contamination of this container.

By way of an example, this gaseous fluid may have been filtered so as to remove the germs and particles. Such gaseous fluid is air, argon or nitrogen, for example. Naturally, the invention is not limited to the use of only these gaseous fluids.

In stage b), said sheets are shaped by suction pressure forming, or under relative vacuum.

Alternatively, in stage b), said sheets are shaped by heat distortion forming.

Preferably, when the sheets are shaped by suction pressure forming or by heat distortion forming, said pile is placed between two mold sections which can be spaced at a distance from one another and brought to bear one against the other thus defining one or more cavities, at least one of these cavities corresponding to the shape and the external dimensions of a container to be manufactured, the latter cavity or cavities then being closed at a section of their periphery corresponding to a section of the peripheral edge of the corresponding container to be formed.

Preferably, for the suction pressure forming, each mold section or at least one of these mold sections has several orifices linked to one or more pump units.

According to a first embodiment, the mold sections can each have a cavity for suction pressure forming, the cavity of the first mold section being the mirror image of the cavity of the second mold section, the cavities coinciding when the first and second mold sections are brought to bear one against the other.

According to a second embodiment, the first mold section can have at least two cavities, at least some of these cavities being identical or each one defining a distinct shape. These cavities of the first mold section are the mirror image of the cavities of the second mold section so that when the mold sections are brought to bear one against the other these cavities coincide to define three-dimensional shapes.

A sealing joint may be envisaged in order to delimit at least partially each cavity in the interior of the mold.

According to a third embodiment, a first mold section can have one or more cavities having the three-dimensional external shape of each container to be produced, the second mold section being a flat plate so that said two sheets are simultaneously shaped to make at least one flexible container on one and the same mold section without separation of said sheets during this shaping.

Preferably, for the heat distortion forming, one of the mold sections has at least one fixed impression forming a projection of said mold section, this impression or at least one of said impressions having a shape, dimensions and spacing relative to the surface of the mold section immediately next to said impression which correspond to the shape, the external dimensions and to half or more or less half of the spacing separating the walls delimiting the storage space of the corresponding container to be manufactured, the other mold section being recessed at the location of said impression or impressions.

after stage b) and before stage c), an additional stage is realized consisting of cooling said at least one container.

Naturally, during the shaping stage, the pile is preferably heated before it is formed by suction pressure forming in order to facilitate this forming.

Throughout at least said stages a) to c) the environment in which the pile of two sheets is placed is controlled so as to limit the presence of bioburden and of particles capable of transporting this bioburden.

At the device allowing realization of stage b), there is advantageously circulation of an air flow from top to bottom, in other words a laminar flow, to push towards the ground the particles or bioburden present in the atmosphere around this device.

This reduces the possibility of contamination of the pile.

Deionization of said pile may also be realized in order to get rid of electrostatic charges capable of bringing about environmental contamination, and in particular the particles which carry the bioburden.

Said sheets are produced from a single film of plastic material or from different films of plastic material, said film or said films having a surface roughness and a thickness such that the adhesion strength of the sheets of said pile prevents any untimely adhesive failure of said sheets.

Preferably, said sheets are produced from a single film of plastic material or from different films of plastic material, having a surface roughness and a thickness such that the adhesion strength of the sheets of said pile prevents any untimely adhesive failure of said sheets thus laid one against the other while still permitting the separation of these sheets when an element for accessing its storage space is introduced.

Prior to stage a), a continuous film is formed by melt extrusion of a plastic material.

Preferably, the continuous film is tubular and split on its lateral edges to form said pile of sheets.

Advantageously, before splitting or cutting said lateral edges, the sheets of the pile will have been sealed in at least one section of the areas of said sheets intended to constitute said peripheral edge of each container. This sealing of said sheets at a very early stage in the process of manufacturing said at least one container guarantees the absence of contaminants in the storage space of each container. The sealing could involve only a section of these areas, for example, to allow:

the insertion of one or more access elements or the creation of one or more slots each designed to receive an element for accessing the internal storage space, the creation of these slots making it possible to avoid any intake of particles and/or of germs during the insertion of each access element between the sheets of the pile, or alternatively the creation of one or more extensions of the walls of the pocket in the form of closed tubes, each of which defines a space having fluid communication with the internal storage space of the pocket.

Alternatively, the continuous film is folded in on itself at the exit of the extruder and cut on its rounded edge so as to form said pile of sheets.

Another subject of the invention is a flexible container obtained by the method as described above, said container comprising two separate walls facing one another joined on a section of their circumference by a sealed peripheral edge, said separate walls defining a storage space of the container.

According to the invention, said walls each include at least one wall extension placed projecting from a corresponding edge of said wall, two extensions facing said two walls being joined on a section of their periphery to define a closed elongation of said container, called an access element, which defines a reception space having fluid communication with said storage space.

Each wall extension therefore forms a single piece with the corresponding wall.

Each elongation thus forms an integral component of the container and consequently is produced from the same material as the sheets of the pile without the need to attach an added access element.

This wall extension is preferably also shaped during stage b) of the method to define a predetermined reception space when two extensions facing one another are sealed on a section of their periphery.

Advantageously, these thus-sealed wall extensions define a tube which is closed at its free end, this closed tube defining an extension of the storage space of the container.

Advantageously, said closed elongation or at least one of said closed elongations comprises on a section of its external surface a reinforcing sleeve.

This sleeve, for example a plastic tube, is attached to the corresponding closed elongation. It allows the latter to be made more rigid so as to allow the filling or emptying of or the taking of samples from the storage space of the vessel.

Advantageously, this container and its integrated access element or elements have a three-dimensional shape.

Advantageously, this container has multiple storage chambers linked to one another by elements for fluid communication. At least one of these chambers has fluid communication between its internal storage space and a tube or a conduit, in order to permit the filling of all of the storage chambers. These storage chambers may have identical configuration or different configuration.

The invention also relates to a three-dimensional flexible container, preferably for cryogenic storage, obtained by the method as described above.

Preferably, this flexible container comprises:

a first wall of a flexible film of plastic material suited to cryogenic storage, said first wall comprising a first area called a peripheral edge area, which is flat or more or less flat, extending in a plane and a second area called a cavity area placed outside of this plane having a predetermined three-dimensional geometry, a second wall covering said first wall to close the second area and thus define an internal storage space, a joint formed solely by sealing of the first and second walls in the first flat or more or less flat area and at least one access element extending through said joint and permitting fluid communication with said internal storage space.

According to the invention, said second area of the first wall comprises a flat or more or less flat area linked to said first flat or more or less flat area by an edge area which is itself a flat or more or less flat area linking slantwise said first and second flat or more or less flat areas of the first wall.

Preferably, said second wall is identical to said first wall.

Advantageously, each container obtained by the manufacturing method of the present invention is housed in a protective case which may be made of glass, flexible or rigid plastic, or metal or a combination of these materials. Thus, and purely for illustrative purposes, one part of this protective case is a casing made of metal such as aluminum or stainless steel, while another part is made of glass or transparent plastic to allow an operator to view the contents and/or the state of the plastic container housed in this protective case.

This protective case may comprise a preferably lateral window or aperture allowing the passage of one or more elements of this container, such as tubes or conduits.

This protective case preferably has a generally prismatic shape. The corners and/or edges of this case can be rounded to facilitate their handling.

The present invention also relates to a molding apparatus for the manufacture of at least one flexible plastic container in accordance with the method as described above, said mold comprising two mold sections which can be spaced apart relative to one another and brought to bear one against the other by being placed facing one another, the two mold sections then defining when they are placed one against the other one or more cavities, at least one of these cavities being formed corresponding to the shape and the external dimensions of a container to be manufactured, said at least one cavity then being closed at a section of its periphery corresponding to a section of the peripheral edge of the corresponding container to be formed, at least one mold section comprising several orifices linked to one or more pump units to generate a suction through said orifices.

Preferably, each mold section comprises several orifices linked to one or more pump units to generate a suction through these orifices.

Advantageously, the orifices of each mold section are then placed only on the right of said cavity or cavities defined by the two sections brought to bear one against the other, said orifices of the two mold sections being placed facing one another, or more or less facing one another, when the two mold sections are brought to bear one against the other.

Preferably, these orifices are spaced at regular intervals to ensure a uniform suction strength over a corresponding section of the sheets of the pile.

Naturally, the placement of the different orifices in a mold section is determined by the objectives to be obtained for this flexible plastic container, each orifice pressing by means of suction a section of a sheet of the pile against at least one section of the wall of the cavity in which it is placed.

Advantageously, said at least one cavity is symmetrical, each mold section being the mirror image of the other.

Thus, and purely for illustrative purposes, the two mold sections brought to bear one against the other defining several cavities, some of them advantageously spaced at regular intervals from one another in a first given direction and intended to define storage chambers of the container, each have:

at each of their opposite ends, a wall, called a front wall for a first of these ends and called a back wall for the other end, which is flat or more or less flat, each of these flat or more or less flat walls being placed in a second direction perpendicular to the first direction so as to define a storage space.

At least one section of the lateral wall which rises up from these front and back walls of each mold section has a flat or rounded shape in order to define the edge linking the back or front wall of the corresponding storage chamber with the peripheral edge which is or will be joined to this storage chamber.

Said cavity or at least one of said cavities comprising at its opposite ends a back wall which is flat or more or less flat, in order to give a flat or more or less flat form to the section of sheet pressed against the corresponding back wall of this cavity, the suction orifices linked to this cavity are preferably placed at the level of said back walls. Naturally, as this back wall has a longitudinal and a horizontal dimension, the corresponding orifice or orifices have a diameter which is strictly less than the horizontal dimension of this back wall.

Furthermore, there is control of the depression created in each cavity by the suction through the corresponding orifice or orifices so as to press without deformation, for example through the orifice or through these orifices, the section of sheet against the wall of the corresponding cavity.

Advantageously, at least one of these cavities thus formed corresponds to the shape and the external dimensions of an element selected from the group made up of a tube, a conduit, a bridging link or an access element, said cavity opening into at least one other corresponding cavity or of which at least one corresponds to the shape and the external dimensions of a container to be manufactured, so that said element has fluid communication with the storage space of at least one container.

Advantageously, at least one of the mold sections is mounted on guiding means in order to ensure the matching of the two mold sections when they are brought to bear one against the other and to thus prevent any imperfect alignment of these mold sections which could negatively affect the quality of the container formed.

More generally, the present invention also relates to a method for the manufacture of at least one flexible plastic container, each container comprising two separate walls facing one another joined at least on a section of their circumference by a sealed peripheral edge, said separate walls defining a storage space.

According to the invention, at least the following stages are realized:

a) using a single continuous film formed by extrusion, creating a pile of sheets of plastic material at the exit of the extruder from said film thus obtained, said sheets being laid one against the other, the surfaces of these sheets which face one another being placed directly in contact with one another without any element serving as an interface, b) simultaneously shaping said sheets thus laid one against the other to define said at least one container without having previously separated these sheets, at least each container being partially formed, said sheets being maintained lying one against the other in at least one section of the areas of said sheets intended to constitute said peripheral edge of each container during this shaping and c) sealing at least partially the areas of said sheets intended to constitute said peripheral edge of at least each container.

Thus in stage a), using a single continuous film formed by extrusion, a pile of sheets is created immediately at the exit of the extruder so as to limit any risk of contamination of the internal walls, laid one against the other, of this pile. The sterility thereof is hereby advantageously assured before proceeding with the manufacturing of the container.

This single film may be a tubular film which will be split on its lateral edges to form said pile of sheets. Alternatively, the continuous film is folded in on itself immediately at the exit of the extruder and cut on its rounded edge so as to form said pile of sheets.

Preferably, before splitting or cutting said lateral edges, the sheets of the pile will have been sealed in at least one section of the areas of said sheets intended to constitute said peripheral edge of each container. This sealing of said sheets at a very early stage in the process of manufacturing said at least one container guarantees the absence of contaminants in the storage space of each container.

The sealing could involve only a section of these areas, for example, to allow:
the insertion of one or more access elements or
the creation of one or more slots each designed to receive an element for accessing the internal storage space, the creation of these slots making it possible to avoid any intake of particles and/or of germs during the insertion of each access element between the sheets of the pile, or alternatively
the creation of one or more extensions of the walls of the pocket in the form of closed tubes, each of which defines a space having fluid communication with the internal storage space of the pocket.

BRIEF DESCRIPTION OF THE DRAWINGS

Other particular advantages, objectives and characteristics of the present invention will become apparent from the following description, which is provided by way of an explanation and is by no means exhaustive, of the attached drawings, in which.

DETAILED DESCRIPTION OF AN EMBODIMENT OF THE INVENTION

Firstly, it is noted that the figures are not to scale.

Figure 1:
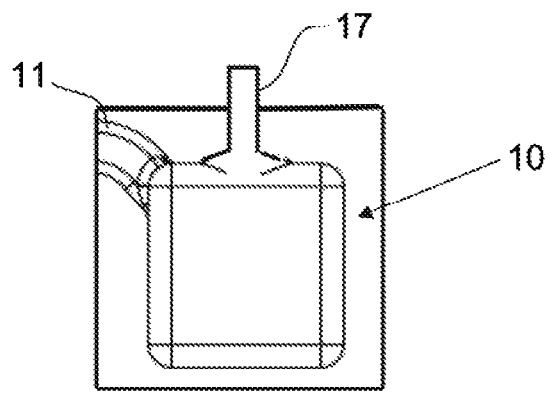
FIG. 1 is a top view of a container/bridging link assembly produced according to a first embodiment of the invention, this assembly not yet having been separated from the sheets which permitted its production.
Figure 2:
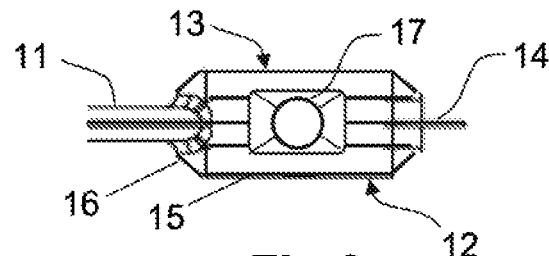
FIG. 2 shows a front view of the assembly of FIG. 1.
Figure 3:
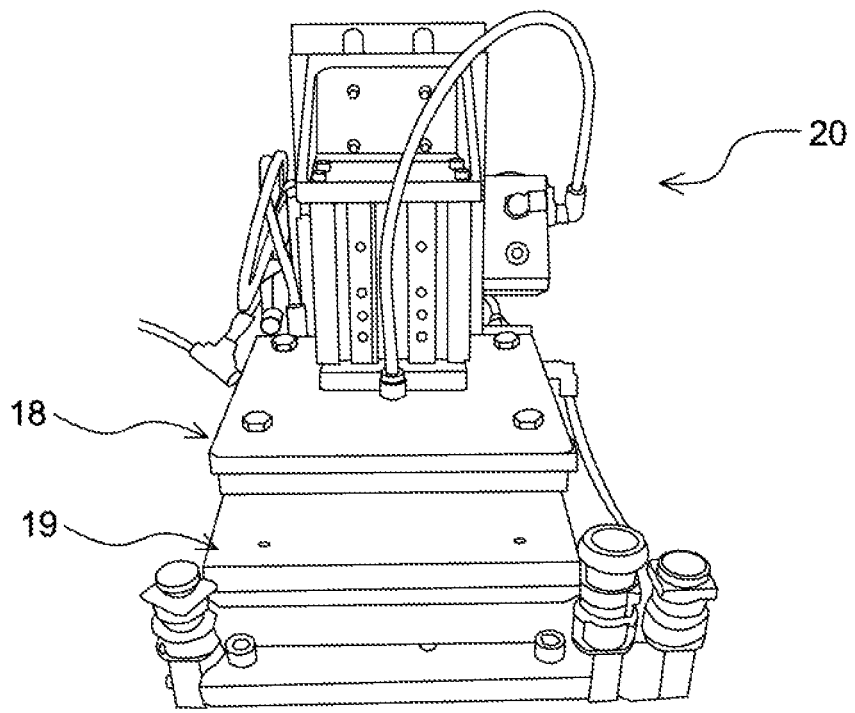
FIG. 3 is a perspective view of a shaping apparatus used for the manufacture of the assembly of FIG. 1 according to a particular embodiment of the invention.

FIGS. 1 and 2 show an assembly comprising a three-dimensional flexible container 10 for the cryogenic storage of a biological substance and a tubular bridging link 11 which forms an integral component of this container such that this bridging link has fluid communication with the storage space of the container, this bridging link permitting linking of this assembly to a connection element (not represented) for the introduction of said biological substance according to a particular embodiment of the invention.

This flexible container 10 comprises a first wall 12 and a second wall 13 made of a flexible film of plastic material suited to cryogenic storage placed facing one another and joined on their periphery by means of sealing. Purely for illustrative purposes, this plastic material is ethylene-vinyl acetate (EVA).

The first wall 12 which is the mirror image of the second wall 13 comprises a peripheral edge area 14 which is flat or more or less flat, where these walls 12, 13 are sealed.

It also comprises an area 15 delimiting one of the most external faces of the container 10, which is flat or more or less flat and parallel to said peripheral edge area 14 and is placed at a distance from the latter to define a first storage chamber.

These areas 14, 15 are linked to one another by an edge area 16 which is flat or more or less flat and which is placed slantwise.

This flexible container also comprises a connection element 17 extending through the seal joining the first and second walls 12, 13 for accessing its storage space for the purpose of filling it with and/or emptying it of a liquid biological substance. This storage space is here defined by the storage chambers of the first and second walls 12, 13.

Figure 4:
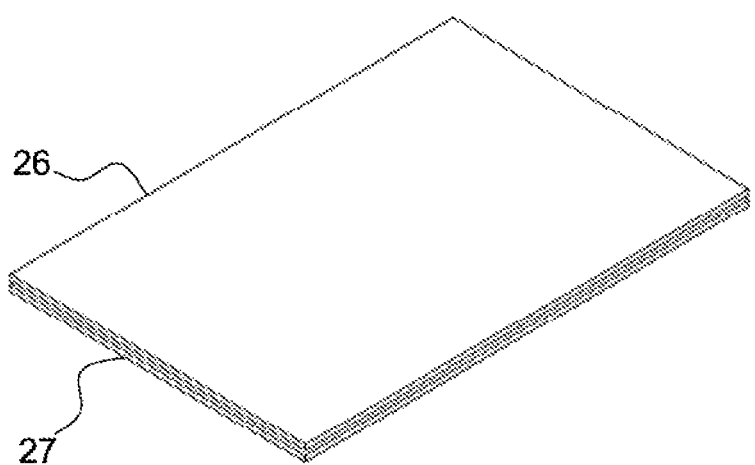
FIG. 4 is a diagrammatic representation of the pile of sheets laid one against the other used to produce the container/bridging link assembly of FIG. 1.
Figure 5:
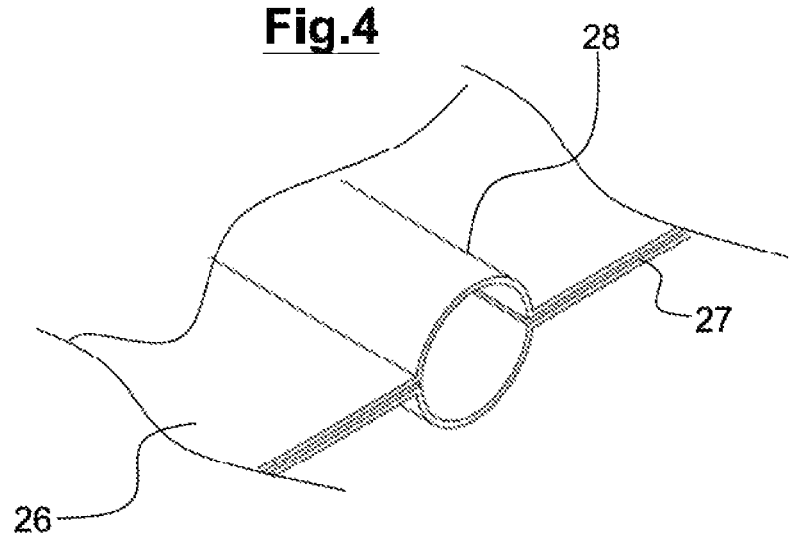
FIG. 5 is a partial and enlarged view of the pile of FIG. 4 after shaping, which shows the slot intended to receive a connection element.

In order to produce this flexible container, firstly a continuous tubular film is formed by melt extrusion of a plastic material, which is cut laterally to obtain a pile of two sheets 26, 27 of plastic material (FIG. 4).

These sheets 26, 27 are laid directly one against the other without any external element being introduced between these sheets. The surfaces which face one another of these sheets 26, 27 are directly contacting so as to prevent contaminants and germs from passing between the sheets.

Advantageously, the adhesion strength of the sheets 26, 27 of the pile prevents any untimely adhesive failure of these sheets.

At the exit of the extruder, a double wound film coil is formed.

This coil is then uncoiled so as to reel out this pile of sheets 26, 27 at a sealing station.

There, the sheets of this pile are directly joined in certain sections of the areas of the sheets intended to constitute the peripheral edge of the container 10 to be produced as well as those intended to constitute the lateral edges of the bridging link 11.

That which has just been described for a vessel/bridging link assembly is of course repeated as many times as necessary to obtain the number of assemblies to be manufactured by reeling out the pile of sheets at this station.

Nevertheless, the sheets of this pile are at no time separated one from the other before or during this sealing stage.

For each assembly, the pile of sheets 26, 27 thus partially sealed and laid one against the other is then heated and placed between the two mold sections 18, 19 of an apparatus 20 for suction pressure forming. The heating stage prior to the shaping of the sheets of the pile is for example realized by exposing the pile to radiation. Alternatively, this heating stage may be realized by means of blowing of filtered hot air. This filtration allows provision of hot air which is free of particles and germs.

The two mold sections 18, 19 can be spaced at a distance from one another and brought to bear one against the other thus defining a first cavity corresponding to the shape and the external dimensions of the container 10 to be manufactured as well as the shape and the dimensions of a slot intended to receive a connection element 17, and a second cavity communicating with the first cavity to define the bridging link 11.

When the two mold sections 18, 19 are brought to bear one against the other, the cavities are closed at their periphery. The cavity permitting the partial creation of the flexible vessel is thus closed at its periphery corresponding to a section of the peripheral edge of the corresponding container to be formed and its periphery corresponding to the slot 28 for the connection element 17 to be formed.

Advantageously, only one of the mold sections 18, 19 comprises these cavities which are linked by orifices to one or more pump units to generate the suction required for the shaping of the pile of sealed sheets.

It is thereby ensured that the sheets 26, 27 of this pile are shaped simultaneously without separation, which significantly reduces the risk of any contamination. The separation of the thus-formed walls of the container in order to partially delimit the storage space is achieved subsequently when the thus-manufactured container is filled with the biological substance.

For each assembly, a stage of cutting is realized which permits the releasing of this assembly. Advantageously, this slot 28 formed for receiving a connection element 17, is closed so as to prevent any introduction of contaminants during the cutting operation.

Furthermore, once the films are sealed and cut, the creation of this slot 28 makes it possible to avoid separating the sheets of the pile in order to insert the connection element 17 and thereby cause an intake of particles and germs via the ambient air.

Figure 6:
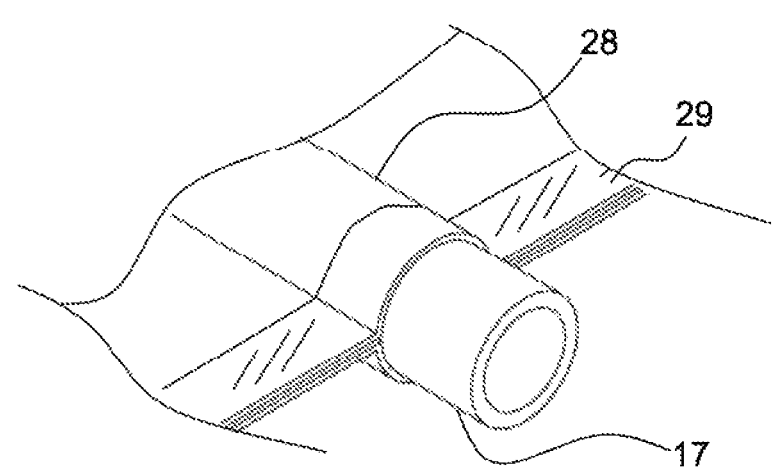
FIG. 6 is a partial and enlarged view of the pile of FIG. 5 after insertion of a connection element into said slot and sealing of this connection element in its slot.
Figure 7:
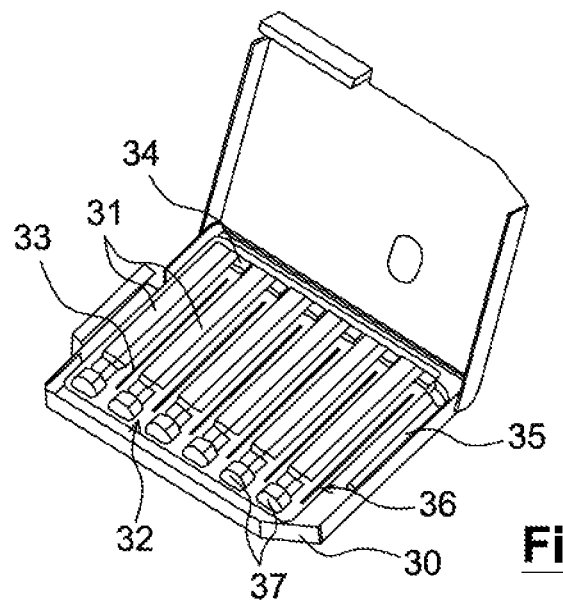
FIG. 7 is a perspective view of a container according to a second embodiment of the present invention, this container comprising multiple storage chambers linked to one another and being housed in a protective case with a view to the cryopreservation of its contents.
Figure 8:
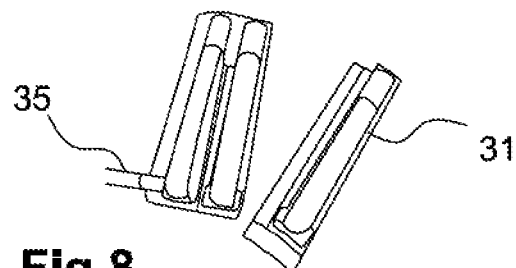
FIG. 8 is a perspective view of the container of FIG. 7 after its filling and separation of several storage chambers, one of these chambers being represented in the proximity of the container.
Figure 9:
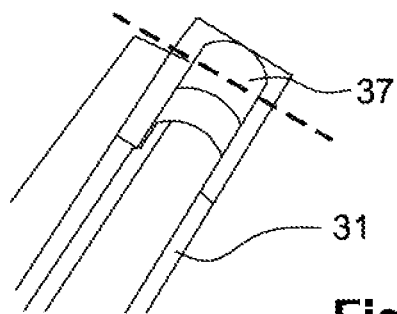
FIG. 9 is a partial and enlarged view of a storage chamber of the container of FIG. 7.

Finally, the connection element 17 is sealed with the peripheral edge 29 of the flexible container to be manufactured (FIG. 6).

A second embodiment of a container of the present invention shall be described below with reference to FIGS. 7 to 10. This container is housed in a metal protective case 30 for the purposes of its handling and its cryogenic storage.

This container has an elongated shape, in this case rectangular, when viewed in a top view, defining a first longitudinal axis. This container comprises multiple storage chambers 31, in this case six (6), which are aligned with spacing at regular intervals from one another. The separation area 32 separating two successive storage chambers 31 has a line 33 of least resistance, or pre-cut strip, which advantageously allows easy separation of the storage chambers 31.

Each storage chamber 31 has an elongated shape extending along a second longitudinal axis perpendicular to said first longitudinal axis.

Two consecutive storage chambers 31 are also linked at their base or lower section by a section 34 of conduit which permits fluid communication between the storage spaces of these storage chambers 31.

The container also comprises a flexible tube 35 placed on a lateral edge of the container and having fluid communication via each section 34 of conduit for fluid communication with the storage space of each of the storage chambers 31.

This tube 35 which serves as an input port of the container permits easy introduction into each storage chamber 31 of the liquid medication, of the cells such as stem cells or of the blood, to be preserved by cryopreservation.

Each individual storage chamber 31 has a three-dimensional shape to allow improved storage, this shape having a longitudinal dimension (here height) in a first direction defined by said second longitudinal axis, which is bigger than both the longitudinal dimension (here width) in a second direction defined by said first longitudinal axis and than the longitudinal dimension (here thickness) in a third direction perpendicular to the first direction and to the second direction.

Thus each individual storage chamber 31 forms a projection on either side of a median plane 36 defined by the pile of sheets not shaped but joined to one another for example by sealing. The two sections of each storage chamber 31 placed facing one another forming a projection of this median plane 36 are symmetrical or form a mirror image of one another relative to this median plane.

With the exception of its upper end, the body of each storage chamber thus comprises a back wall which is flat or more or less flat and a front wall which is flat or more or less flat, which are both placed in said third direction, at a distance from said median plane 36 and which are distinct from one another to define the storage space of the chamber. These front and back walls are linked at the peripheral edge of the storage chamber 31 extending in the median plane 36 by lateral walls which have a rounded or flat or more or less flat shape. In the latter case, these lateral walls can be placed slantwise.

The upper end of each storage chamber comprises a sampling port 37 with a three-dimensional shape which is sterile and empty. This sampling port 37 is separated from the storage space of the corresponding storage chamber by a watertight connecting strip, obtained for example by sealing, created on a level with a funnel 38 of the storage chamber 31.

Figure 10:
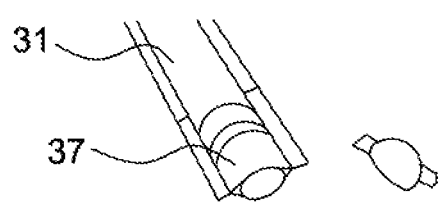
FIG. 10 is a partial and enlarged view of a storage chamber of the container of FIG. 7, the end of which has been cut to allow the taking of samples from the contents of the storage chamber.

As represented in FIG. 10, this sampling port 37 is configured to define a slot when it has been opened by means of a transverse cut, intended to receive a trocar (not represented) while ensuring the impermeability of its connection with the latter.

The invention claimed is:

1. A method for the manufacture of at least one flexible plastic container, each container comprising two separate walls facing one another joined at least on a section of their circumference by a sealed peripheral edge, said separate walls defining a storage space of the container, wherein at least the following stages are realized:

a) forming a pile of two sheets of plastic material, said sheets being laid one against the other, the surfaces which face one another of these sheets being placed directly in contact with one another without any element acting as an interface, b) simultaneously shaping said sheets thus laid one against the other in order to define said at least one container without having previously separated these sheets, where simultaneously shaping said sheets comprises, with at least each container being partially formed, said sheets being maintained lying one against the other in at least one section of the areas of said sheets intended to constitute said peripheral edge of each container during this shaping, said shaping being realized by suction pressure forming by placing said pile between two mold sections which can be spaced at a distance from one another and brought to bear one against the other thus defining one or more cavities, at least one of these cavities thus formed corresponding to the shape and the external dimensions of a container to be manufactured, said at least one cavity then being closed at a section of its periphery corresponding to a section of the peripheral edge of the corresponding container to be formed, at least one of said mold sections comprising several orifices linked to one or more pump units, c) sealing at least partially the areas of said sheets intended to constitute said peripheral edge of at least each container.

2. The method according to claim 1, wherein an additional stage is realized which consists for each container of inserting between said sheets at least one element for accessing its storage space permitting fluid communication between this storage space and the exterior.

3. The method according to claim 1, wherein the areas of said sheets intended to constitute said peripheral edge of each container are at least partially sealed before realizing stage b.

4. The method according to claim 1, wherein in stage b, also by shaping of said sheets there is definition of a slot for each element for accessing the storage space of the container or containers, each slot being configured to receive the corresponding access element.

5. The method according to claim 1, wherein in stage b, also by shaping of said sheets there is definition of at least one closed elongation, called an access element, of said container or of at least some of said containers, each closed elongation defining a reception space having fluid communication with said storage space of the corresponding container.

6. The method according to claim 1, wherein in stage b, also by shaping of said sheets there is definition of at least one conduit or bridging link connected to a peripheral edge of at least one container to permit the filling thereof, said conduit defining an internal channel having fluid communication with the storage space of said at least one container.

7. The method according to claim 6, wherein having filled said container or containers, there is sealing of the remainder of the sheets separated at said peripheral edge of each container so as to close each container.

8. The method according to claim 1, wherein in stage b, said sheets are also maintained lying one against the other in at least one distinct area of said peripheral edge of one or more containers to divide the internal space of the corresponding container or containers.

9. The method according to claim 1, wherein in stage b, there is simultaneous shaping of said two sheets to make at least one flexible container without separating said sheets during this shaping.

10. The method according to claim 9, wherein after stage c, said sheets are separated at the at least one container by means of the introduction of the sole biological material intended to be contained in this container so as to limit its contamination or by circulation of a controlled gaseous fluid.

11. The method according to claim 1, wherein after stage b and before stage c, an additional stage is realized consisting of cooling said at least one container.

12. The method according to claim 1, wherein throughout at least said stages a to c, the environment in which said pile of two sheets is placed is controlled so as to limit the presence of bioburden and of particles capable of transporting this bioburden.

13. The method according to claim 12, wherein at the device or the machine permitting realization of stage b, an air flow is circulated from top to bottom to push towards the ground the particles or bioburden present in the atmosphere around said device.

14. The method according to claim 1, wherein deionization of said pile is realized in order to get rid of electrostatic charges.

15. The method according to claim 1, wherein said sheets are produced from a single film of plastic material or from different films of plastic material, said film or said films having a surface roughness and a thickness such that the adhesion strength of the sheets of said pile prevents any untimely adhesive failure of said sheets.

16. The method according to claim 1, wherein prior to stage a, a continuous film is formed by melt extrusion of a plastic material.

* * * * *